July 31, 1956 R. D. HUDSON, JR., ET AL 2,756,928
INTEGRATING DEVICES
Filed Oct. 23, 1951 2 Sheets-Sheet 1

INVENTORS
RICHARD D. HUDSON JR.
EDGAR D. TILLYER
BY Louis L. Gagnon
ATTORNEY

July 31, 1956 — R. D. HUDSON, JR., ET AL — 2,756,928
INTEGRATING DEVICES
Filed Oct. 23, 1951 — 2 Sheets-Sheet 2

INVENTOR
RICHARD D. HUDSON JR.
EDGAR D. TILLYER
BY
Louis L. Gagnon
ATTORNEY

United States Patent Office 2,756,928
Patented July 31, 1956

2,756,928

INTEGRATING DEVICES

Richard D. Hudson, Jr., Noroton, Conn., and Edgar D. Tillyer, Southbridge, Mass., assignors to American Optical Company, Southbridge, Mass., a voluntary association of Massachusetts Application October 23, 1951, Serial No. 252,752

5 Claims. (Cl. 235—61)

This invention relates to integrators and has particular reference to devices for automatically scanning a source of information such as a spectral transmission curve and timing the scanning process at various predetermined ordinates or wavelengths for obtaining a resultant reading which is proportional to the sum of the transmissions at the selected ordinates.

Prior known methods of calculating the tristimulus values of a piece of material have been generally long tedious processes involving preparation of a spectral transmission curve, reading the curve at a selected specific number of wavelengths, adding the readings together and multiplying the sum by a selected factor, with the resulting product being one of the values desired. To find the remaining two values the entire process must be repeated for each using different wavelengths and multiplying by different factors.

Some manually operated integrators have been developed to accomplish the reading and summation of the various transmissions but operation of these devices has been found to be tiresome and the devices are relatively expensive to manufacture.

Therefore, it is a primary object of this invention to provide such an integrator which is automatic in its operation and which can be manufactured at relatively low cost.

Another object is to provide an integrator embodying a rotatable support for carrying a source of information such as a spectral transmission curve or graph, a light-sensitive device for receiving light from said source of information and operable in response to variations in intensity of the light as brought about by the source of information as it is rotated to control the operation of recording means, and means for intermittently advancing the light-sensitive device across the source of information whereby the recorded values will be taken at selected ordinates, said recording means being adapted to indicate the sum total of the recordings as obtained at selected ordinates.

Another object is the provision of a device of the above character whereby said means for advancing the light sensitive device for receiving light from the source of information embodies a second light sensitive device for receiving light from a transparent graduated scale, said second light sensitive device having operatively associated therewith electrical equipment which, when said second light-sensitive device responds to a different intensity of light as introduced by alignment thereof with a graduation on said scale, will function to temporarily and automatically prevent further advancement of the first light-sensitive device whereby said first device will scan the source of information along the path established by said graduation and at the completion thereof, the means for advancing the first light-sensitive device will be rendered inoperative until said second light-sensitive device moves into alignment with the next succeeding graduation on the scale.

Other objects and advantages of the invention will become apparent from the following description taken in connection with the accompanying drawings in which.

Figure 1:
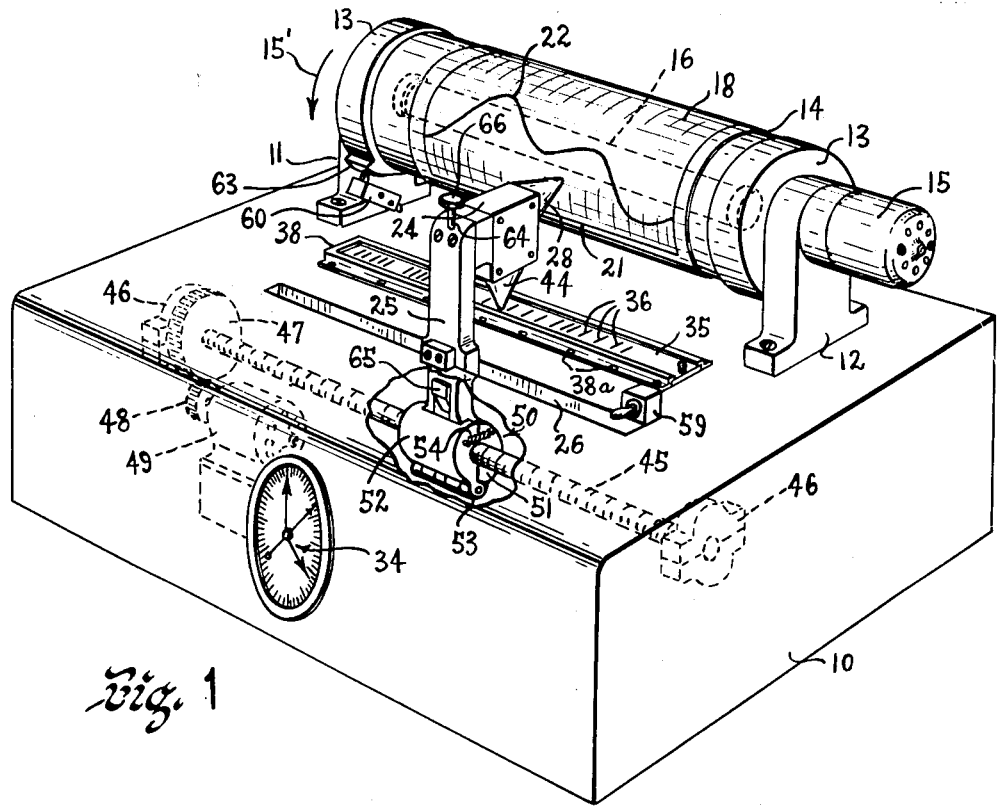
Fig. 1 is a front perspective view of a device embodying the present invention.

Referring more particularly to the drawings, a preferred form of the invention is shown in Fig. 1 and comprises a hollow base 10 on the upper surface of which is secured a pair of spaced uprights 11 and 12 which are adapted to rotatably support metal or plastic caps 13 mounted over the opposed ends of a hollow transparent cylinder 14. The cylinder 14 may be formed of glass or transparent plastic material and is adapted to be rotated preferably in the direction indicated by the arrow 15' by means of a synchronous motor 15. The connection between the motor 15 and cylinder 14 may be any conventional driving mechanism (not shown) whereby the cylinder 14 will be made to rotate about its longitudinal axis when the motor 15 is in operation.

Mounted longitudinally within the transparent cylinder 14 is a source of illumination such as a fluorescent lamp 16 which is suitably connected for continuous illumination as by a rotary contact or the like (not shown) to a source of electrical energy.

Figure 2:
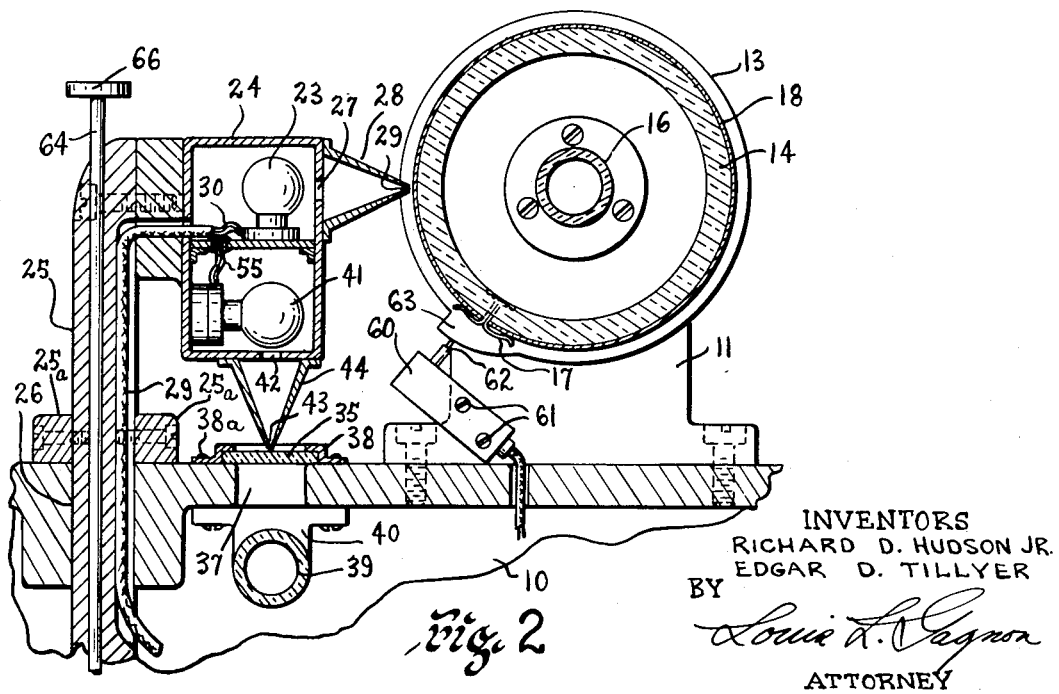
Fig. 2 is a fragmentary vertical sectional view of the device shown in Fig. 1.

Fixedly carried adjacent the ends of the cylinder 14 are spaced pairs of spring clips 17 (Fig. 2) which serve to anchor the corners of a graph 18 in encircling relation with the cylinder 14. The graph 18 may be formed of transparent or translucent paper, plastic, or other suitable material, preferably of a type which is not overly sensitive to seasonal or other atmospheric changes. The graph 18 is preferably provided with conventional ruled squares 19 and numeric indications 20 which are formed preferably as faint semi-transparent imprints upon the surface of the graph 18. The lower border or zero line 21, however, is formed as a heavy opaque line of considerable thickness in comparison with the lines of the ruled squares 19. The graph line 22 is also provided as a heavy opaque line and indicates to an operator, for example, the spectral transmission curve of a piece of material such as glass, plastic or the like.

Illumination from the lamp 16 passes through the transparent wall of the cylinder 14 and through the graph 18 and is adapted to be picked up by a photoelectric cell 23 which is located within the upper portion of a divided housing 24 fixedly carried at the upper end of an arm 25 extending upwardly through a longitudinal slot 26 in the base 10. The arm 25 is provided on its opposed sides with blocks 25a screwed or otherwise fixedly secured thereto and serving as guides to maintain the arm constantly in desired vertical position.

The housing 24 is provided with an opening 27 in its side directed toward the cylinder 14 and has a hollow conical member 28 mounted externally thereof over the opening 27. The end of the conical member 28 is adapted to be positioned very close to the graph 18 and is provided with a restricted opening 29 of a diameter smaller than the width of the heavy zero line 21 and curve line 22 of the graph.

Thus, in using the device, when the synchronous motor 15 is operated to continuously rotate the cylinder 14 and graph 18, illumination from the lamp 16 will impinge upon the cell 23 through the openings 29 and 27. However, when a zero line 21 or curve line 22 passes by the opening 29, it will momentarily prevent the light from passing to the photoelectric cell 23.

Figure 3:
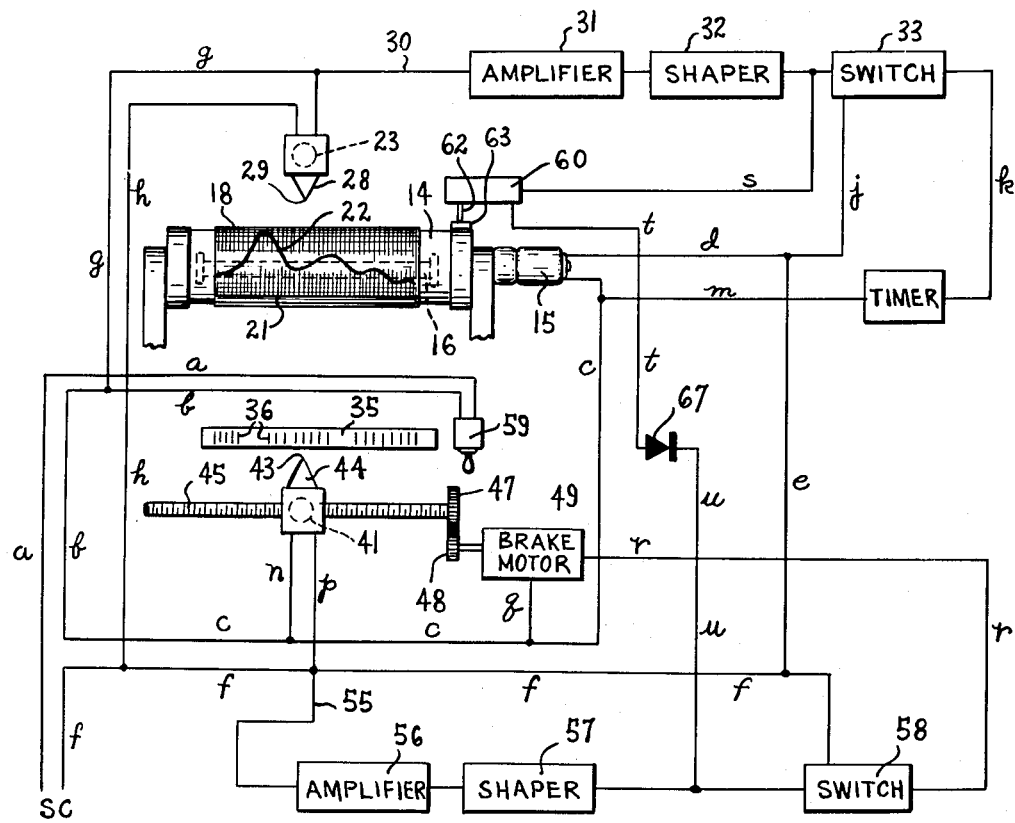
Fig. 3 is a schematic view illustrating diagrammatically a preferred arrangement of the electrical equipment.
Figure 4:
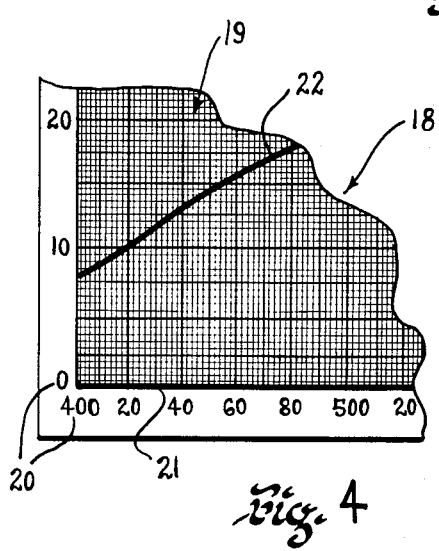
Fig. 4 is a fragmentary view of a graph of the type preferred for use with the present invention.

Since it is desired to record a series of specific transmission values the first value will be recorded as the photoelectric cell 23 scans the space on the graph 18 between the zero border line 21 and curve line 22. This is accomplished, by suitable electrical means connected to the photoelectric cell 23, as follows:

A main switch 59 located adjacent one end of the slot 26 is closed which permits current from the source of energy SC to pass through circuit a—b—c—d—e—f to the motor 15. The motor then rotates the cylinder 14 and graph 18. The cell 23 is connected to the source of current SC by circuit a—b—g—h—f and, therefore, functions when the light from lamp 16 impinges thereupon. When the zero line 21 passes by the opening 29 in conical member 28, the light from lamp 16 is momentarily prevented from reaching the cell 23. This causes a pulse to be generated which is passed, as shown schematically in Fig. 3, through lead 30 to an amplifier stage 31 where it is amplified. It then passes to a pulse shaping stage 32 where it is properly shaped and thence to a "flip-flop" switch or one-shot multivibrator 33. The pulse causes the switch 33 to conduct and thereby start operation of a timing device 34 through circuit f, e, j, k, m, c, b and a. The timing device 34 is preferably a clock such as the type having a continuously operating motor, a reset mechanism, and a magnetic clutch which operates to start and stop movement of the clock hands. With such a device the magnetic clutch would be located in the plate circuit of the "flip-flop" switch, and when that side of the switch is conductive the clock will operate and will continue to do so until conduction ceases.

The "flip-flop" switch may be a conventional type suitable for this purpose such as the two-way stable circuit originated by Eccles-Jordan, and various well known modifications thereof.

While the cylinder continues to rotate, the timer 34 will run until the curve line 22 passes between the lamp 16 and photoelectric cell 23 and again blocks out the light in a manner similar to the zero line 21. This will again cause a pulse to be generated, amplified, shaped and transmitted to the switch 33 which will operate to render the timer 34 inoperative. The cylinder 14 meanwhile continues to ratate as long as main switch 59 is closed. The timer 34 will not operate again until the zero line 21 again causes a pulse to be generated as described.

In order to properly integrate the values of a series of transmissions at various wavelengths, it is necessary that the foregoing procedure be repeated a specific number of times and the accumulative values indicated on the timing device 34. For example, in calculating any one of the A, B or C values of a piece of glass, a separate series of selected ordinates are necessary. That is, the transmission values must be tabulated and totaled at a plurality of selected wavelengths. Ordinate scales 35 (Figs. 1, 2 and 3) thus are made up for any particular illuminant (A, B or C) and for 10, 30 or 100 selected ordinates.

Such scales 35 are preferably elongated strips of transparent plastic or vitreous material having the ordinates 36 marked thereon by heavy opaque lines. The base 10 of the device is provided with a second slot 37 similar to and parallel with the slot 26. A grooved U-shaped guide 38 is secured as by screws 38a over the slot 37, and the selected ordinate scale 35 inserted in the grooves therein over the slot 37. A second source of illumination such as fluorescent lamp 39 is attached as by brackets 40 to the inner side of the base 10 immediately below the slot 37 and thus emits light which passes upwardly through the slot 37 and also through the ordinate scale 35.

The housing 24 is located above the ordinate scale 35 and carries in its lower portion a second photoelectric cell 41 which is adapted, through an opening 42 in the housing 24 and a second restricted opening 43 in a hollow cone 44 secured over the opening 42, to receive light from the lamp 39. The cell 41 operates through circuit a—b—c—n—p—f.

The entire photoelectric cell arrangement is adapted to be moved lengthwise of the slot 26 along a threaded shaft 45 which is located in bearings 46 carried by the side walls of the base 10. The shaft 45 is located within the base 10 below and parallel with the slot 26 and is adapted to be rotated by means of a gear wheel 47 carried thereon which meshes with a gear wheel 48 carried by a brake motor 49. The lower end of the supporting arm 25 is provided with a split bearing 50 embodying a fixed portion 51 which is formed integral with the lower end of the arm 25 and a movable portion 52 hinged along its lower edge as at 53 to the fixed portion 51. The split bearing 50 is mounted over the shaft 45, the hinged portion 52 being threaded to mesh with the threads on the shaft 45, and a spring device 54 having its opposed ends connected to the portions 51 and 52 serves to yieldably retain said portions in intimate closed relation over the shaft 45. Thus, when the motor 49 is operated the shaft 45 will rotate to move the arm 25 and consequently the housing 24 and photoelectric cells 23 and 41 transversely of the base. The limits of movement, however, are restricted by the slot 26.

The motor 49 is controlled by the photoelectric cell 41 in a manner similar to the operation of the timer 34 by photoelectric cell 23. The cell 41 is connected by a lead 55 successively to an amplifier 56, a pulse shaper 57 and a "flip-flop" switch 58. When the switch 58 is in closed condition the motor 49 operates through circuit a—b—c—q—r—f. This moves the arm 25 along slot 26 until the cell 41 is moved to a point where an ordinate 36 covers the opening 43 and cuts off momentarily the light going to the cell 41. This causes generation of a pulse which passes through lead 55 to the amplifier 56, shaper 57 and "flip-flop" switch 58 which operates to stop the motor 49 and consequently check further movement of the arm 25 and photocells 23 and 41 whereupon the cell 23 will scan the graph 18 at this ordinate.

Figure 5:
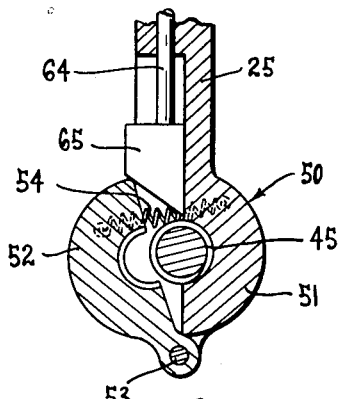
Fig. 5 is a fragmentary sectional view of a portion of the driving means for the photoelectric cell arrangement.

Means is provided for adjusting the photoelectric cell arrangement in any desired lateral position and for returning the device to the starting position at the end of a cycle of operation. Such means embodies a plunger 64 which extends longitudinally within the arm 25 and has one end formed with a wedge-shaped portion 65 (Fig. 5) which is adapted to be forcibly inserted between the portions 51 and 52 of the split bearing 50 and to move the hinged portion 52, against the tension of spring device 54, out of meshing engagement with the shaft 45. The upper end of the plunger 64 is provided with a knob 66 which can be pressed by the operator's thumb for disengagement of the bearing whereupon the arm can be easily manually moved to the desired position. Upon release of the pressure upon the plunger 64, the spring device 54 will automatically return the bearing portion 52 to normal meshed relation with the shaft 45.

A complete cycle of operations is as follows:

A graph 18 is inserted beneath the clips 17 on the cylinder 14, and the cylinder 14 is manually rotated to a position where the zero line 21 is positioned slightly above the aperture 29 communicating with the photoelectric cell 23. The "flip-flop" switch 58 is in closed condition. The photoelectric cell arrangement is positioned at the starting end of the slot 26. The main switch 59 is manually operated to close the circuit a—b—c—d—e—f to the motor 15 and thus starting rotation of the cylinder 14 and graph 18 in the direction indicated by arrow 15'. The brake motor 49 is simultaneously started through circuit a—b—c—q—r—f. The motor 49 thus rotates shaft 45 and moves the arm 25 transversely of the base 10 and along slot 26 and simultaneously moves the photo cell 41 longitudinally of the ordinate scale 35. When the first graduation 36 on the scale 35 covers the opening 43 and cuts off the light going to the cell 41, this causes generation of the pulse which passes through lead 55 to the amplifier 56, shaper 57 and switch 58 which operates to stop the motor 49 and consequently check further movement of the arm 25. Thus the photoelectric cell 23 will scan the graph 18 along a path located in accordance with the graduation 36 on the scale 35 at which the aperture 43 is covered. As the cylinder 14 continues to rotate, the zero line 21 on the graph 18 will eventually cover the opening 29 and consequently cause the cell 23 to generate a pulse for operating switch 33, thereby closing the circuit to the timer 34, circuit a—b—c—m—k—j—e—f. The timer 34 will then operate until the curve line 22 covers opening 29, causing a pulse to be generated by photoelectric cell 23 which is transmitted to the switch 33 which will operate to stop operation of the timer 34. The pulse thus generated by the cell 23 when the curve line 22 covers the opening 29 will simultaneously be transmitted to the switch 58 through lead s, normally closed micro-switch 60 lead t, rectifier 67 and lead u. The switch 58 then will operate to close the circuit to the brake motor 49 which will then move the arm 25 along the slot 26 until the next ordinate 36 on the scale 35 covers the opening 43 and causes a pulse generation to stop the motor 49 as described. Then the cycle is repeated successively until all the determinations have been made at the selected ordinates, the timer 34 then registering the total values at the selected wavelengths in accordance with the ordinates 36 on the scale 35. After completion of the last scanning operation at the last ordinate, the brake motor 49 will be operated as described by the pulse created by passage of the curve line 22 across the opening 29 to move the arm 25 toward the finishing end of the slot 26. When the arm 25 has approached the end of the slot 26 it will automatically open the main switch 59 and thus stop further operation of both motors 15 and 49. Then the arm can be manually returned to the opposite end of the slot 26 as described and a new scale 35 substituted for the one previously used whereby another of the tristimulus values can then be calculated.

With the connection s—t—u between leads 55 and 30, however, it is apparent that pulses generated by photoelectric cell 41 would normally also travel to switch 33 and thus cause undesired operation thereof. To prevent this the rectifier 67 or other type of one way device is inserted in the connection to allow current to pass only from lead 30 to lead 55.

Means is also necessary, however, to prevent the pulse generated by cell 23 from passing to switch 58 when the zero line 21 passes opening 29. Such means is provided by the normally closed micro-switch 60 which is inserted in line s—t—u. The micro-switch 60 is preferably secured as by screws 61 to one of the uprights 11—12 in such a manner that the actuator or plunger 62 thereof will be operated to open the contacts therein by a raised cam-like member 63 provided on the adjacent cap 13 enclosing one end of the cylinder 14.

The raised member 63 is so positioned with respect to the graph 18 that as the zero line approaches the conical member 28 and immediately before the zero line covers the opening 29 the switch 60 will operate to open the circuit through s—t—u. The circuit will be held open, however, only for a sufficient length of time for the zero line to pass the opening whereupon the end of the raised member 63 will pass beyond the actuator 62 and the switch will then automatically return to normal closed condition. Thus, the impulse generated by the zero line 21 will not operate switch 58 to start the brake motor 49.

By using an integrator of the character described herein, it will be apparent that a great saving of time and labor can be eliminated, particularly in calculating the tristimulus values of a piece of material. The selected number of transmission values are automatically totaled and the sum need merely be multiplied by a selected factor to yield the desired A, B or C value being sought.

While the device has been shown and described as embodying light sources and means responsive to light, any desired source of radiation might be used instead of light and suitable means responsive to such radiation might be substituted for the light sensitive means. For example, a source of infra red or sound wave radiations might be substituted for the source of visible light radiation and means responsive to such radiations might be substituted for the visible light sensitive means, etc.

From the foregoing description it will be seen that all of the objects and advantages of this invention have been accomplished by the provision of an integrator which will automatically scan the spacing on a graph between a zero line and curve at a plurality of selected ordinates and will simultaneously record a summation thereof.

It is to be understood, however, that a counter or other recording means may be substituted for the timer described herein and other suitable electric controls may be substituted for those described.

In fact, it will be apparent, that many changes may be made in many of the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

We claim:

1. In a device of the character described for scanning a source of information having areas of different light-altering characteristics thereon and supported for rotary movement relative to a given station point, illuminating means for directing light through said source of information to be received by said station point, said station point embodying an apertured member in alignment with light sensitive means responsive to light of varying intensities, said station point being movable in a path transversely of said source of information, scale means having indicia thereon adapted to function cooperatively with said source of information for designating desired paths of scanning of said source of information by said light sensitive means and said associated apertured member, said indicia having different light-transmitting characteristics than the scale means, a source of illumination for projecting light through said scale means, a second station point embodying an apertured member carried for movement with said first light sensitive means longitudinally of said scale means having the indicia thereon simultaneous to the movement of said first apertured member transversely of the source of information and adapted to receive light through said aperture from said scale means, a second light sensitive means in alignment with said second apertured member responsive to light of different intensities as effected by said indicia on the scale means, driving means for moving said respective station points respectively longitudinally of the source of illumination and said scale means having the indicia thereon, means responsive to said second light sensitive means for rendering said driving means inoperative when the second station point is aligned with a respective indicia for retaining said first station point and said first light sensitive means at a selected position with respect to the source of information for scanning said source of information along a circumferential path as said source of information is rotated, and indicating means operatively connected with said first light sensitive means for indicating selected areas of different intensities of said source of information along said path together with means operably associated with said first light sensitive means to render the driving means again operative to move said station points to the next selected position when said circumferential path has been scanned.

2. An integrating device of the character described for use in scanning graphs having an information line plotted thereon relative to an abscissa axis and ordinate values extending normal thereto where said abscissa axis and information line have different light altering characteristics than the remainder of the graphs, said device comprising supporting means for holding said graphs for continuous rotary movement about an axis paralleling said abscissa axis, means for illuminating said graphs when so held, and light sensitive means aligned with said supporting means and responsive to the change in light altering characteristics as effected by the information line and abscissa axis during scanning of the graphs, indicating means operatively connected with said light sensitive means so as to indicate the interval between the sensitizing thereof by said abscissa axis and information line as the graphs are rotated by said supporting means, and means restricting said scanning to predetermined individual ordinate values on said graphs which are normal to said abscissa axis.

3. An integrating device of the character described for use in scanning graphs having an information line plotted thereon relative to an abscissa axis and ordinate values disposed normal thereto where said abscissa axis and information line have different light altering characteristics than the remainder of the graphs, said device comprising supporting means for said graphs, means for illuminating said graphs when so held, light sensitive means aligned with said supporting means, means for obtaining relative movement between said light sensitive means and graph supporting means in the direction of the ordinates thereof to permit scanning of the graphs, said light sensitive means being responsive to a change in light altering characteristics as effected by the information line and abscissa axis lines during scanning of the graphs, indicating means operatively connected with said light sensitive means so as to indicate the interval between the sensitizing thereof by said abscissa axis and information line as the graph supporting means and light sensitive means are so moved relative to each other, and means restricting said scanning to pre-selected individual ordinate values which are normal to said abscissa axis.

4. An integrating device of the character described for use in scanning graphs having an information line plotted thereon relative to an abscissa axis and ordinates normal thereto where said abscissa axis and information line have different light altering characteristics than the remainder of the graphs, said device comprising suppporting means for holding said graphs for continuous rotary movement about an axis paralleling said abscissa axis, means for illuminating said graphs when so held, and light sensitive means aligned with said supporting means so as to be sensitized by a change in light altering characteristics as effected by the information line and abscissa axis during scanning of the graphs, indicating means operatively connected with said light sensitive means so as to indicate the interval between the sensitizing thereof by said abscissa axis and information line as the graphs are rotated by said supporting means, said light sensitive means being carried by a support adapted to move in a direction paralleling said axis of the supporting means, means for stopping the movement of said support for the light sensitive means at predetermined locations to permit recording of the interval between the abscissa axis and the information line along selected ordinates on the graphs, means operatively connected with the light sensitive means for starting movement of said means as said information line is being scanned during rotation of the graphs along one ordinate and means preventing starting of said movement when the abscissa axis is being scanned.

5. An integrating device of the character described for use in scanning material having different light altering characteristics in different portions thereof, said device comprising supporting means for holding said material, means for illuminating said material when so held, light sensitive means aligned with said material supporting means, means for obtaining relative movement between said light sensitive means and material supporting means in a first direction to permit scanning of the material in said direction, said light sensitive means being responsive to change in light altering characteristics as effected by said portions of the material during the scanning thereof in said direction, indicating means operatively connected with said light sensitive means to indicate the amount of sensitizing of said light sensitive means as said material and light sensitive means are moved relative to each other in said direction, means for obtaining relative movement of the light sensitive means and material supporting means in a second direction approximately normal to said first direction, and control means stopping and starting said latter relative movement, said control means being operatively connected with the light sensitive means and adapted to prevent said movement during scanning of the material in said first direction between predetermined points and to cause relative movement in said second direction to locate the light sensitive means in position to scan the material in said first direction between predetermined points at a new preselected location.

References Cited in the file of this patent
UNITED STATES PATENTS

| | | |
|---|---|---|
| 2,184,156 | Bowles | Dec. 19, 1939 |
| 2,199,769 | Woolley | May 7, 1940 |
| 2,360,883 | Metcalf | Oct. 24, 1944 |
| 2,635,195 | Hancock | Apr. 14, 1953 |